United States Patent
Lermant et al.

(10) Patent No.: US 6,856,428 B1
(45) Date of Patent: Feb. 15, 2005

(54) BLACK TEXT PRINTING FROM PAGE DESCRIPTION LANGUAGES

(75) Inventors: Pierre Lermant, Sunnyvale, CA (US); Ghilad Dziesietnik, Palo Alto, CA (US); Victor Kliorin, Foster City, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/329,656

(22) Filed: Jun. 10, 1999

(51) Int. Cl.[7] .............................................. G06F 15/00
(52) U.S. Cl. ...................................... 358/1.9; 358/1.12
(58) Field of Search ...................... 358/1.1, 1.9, 1.12, 358/1.15, 447, 453, 518, 530; 345/434, 501, 502, 503, 508; 382/176, 180

(56) References Cited

U.S. PATENT DOCUMENTS

| | | | |
|---|---|---|---|
| 4,546,700 A | 10/1985 | Kishner et al. | 101/211 |
| 4,857,715 A | 8/1989 | Koch et al. | 235/456 |
| 5,208,663 A * | 5/1993 | Hiratsuka et al. | 358/500 |
| 5,295,236 A * | 3/1994 | Bjorge et al. | 345/434 |
| 5,313,570 A | 5/1994 | Dermer et al. | 395/131 |
| 5,542,052 A | 7/1996 | Deutsch et al. | 395/131 |
| 5,613,046 A | 3/1997 | Dermer | 395/109 |
| 5,666,543 A | 9/1997 | Gartland | 395/788 |
| 5,668,646 A | 9/1997 | Katayama et al. | 358/530 |
| 5,668,931 A | 9/1997 | Dermer | 395/104 |
| 5,687,303 A * | 11/1997 | Motamed et al. | 358/1.17 |
| 5,689,425 A | 11/1997 | Sainio et al. | 364/469.03 |
| 5,737,088 A | 4/1998 | Coleman | 357/296 |
| 5,784,172 A | 7/1998 | Coleman | 358/298 |
| 5,819,655 A | 10/1998 | Dellivenneri et al. | 101/211 |
| 5,923,821 A * | 7/1999 | Birnbaum et al. | 358/1.9 |
| 6,006,013 A * | 12/1999 | Rumph et al. | 358/1.1 |

FOREIGN PATENT DOCUMENTS

| | | | |
|---|---|---|---|
| CA | 2210596 | 3/1998 | G06K/15/02 |
| EP | 403054 B1 | 4/1990 | G06T/11/00 |
| EP | 403054 A2 | 12/1990 | G06F/15/72 |
| EP | 618546 A1 | 10/1994 | G06K/15/00 |
| EP | 618718 A1 | 10/1994 | H04N/1/46 |
| EP | 620534 A1 | 10/1994 | G06K/15/00 |
| EP | 627846 A1 | 12/1994 | H04N/1/46 |
| EP | 674277 A2 | 9/1995 | G06F/17/21 |
| EP | 0 674 289 A2 | 9/1995 | G06K/15/02 |
| EP | 718793 A2 | 6/1996 | G06K/15/02 |
| EP | 0782098 | 7/1997 | G06K/15/10 |
| EP | 0833216 | 4/1998 | G03G/15/01 |
| EP | 862136 A2 | 9/1998 | G06T/5/00 |
| EP | 863480 A2 | 9/1998 | G06K/15/10 |
| WO | 99/24933 | 5/1999 | G06K/15/02 |

* cited by examiner

*Primary Examiner*—Gabriel Garcia

(57) ABSTRACT

A technique for printing black text on a colored background, in which the graphics are broken down into three categories: text, polygons (also referred to as line drawing or vectors), and images (also referred to as bitmaps or raster data) when the incoming graphic information is a Page Description Language (PDL) data file (e.g. Adobe Postscript-PS- or Hewlett-Packard PCL). If the object is not a text object, it is processed in a normal manner. If the object is a text object, a determination is made if the color of the object is black. If the object is not a black text object, it is processed in a normal manner. If the object is a black text object, special processing and rasterization techniques are applied. Thus, the invention exploits to advantage the fact that it is possible in most PDL instances to treat black text differently from other black objects.

26 Claims, 4 Drawing Sheets

(1) PDL : Page Description Language (e.g. PS, PCL)

(2) Object : Graphic Object: (Text/Image/Polygon)

BLACK TEXT PRINTING FROM PAGE DESCRIPTION LANGUAGES

BACKGROUND OF THE INVENTION

1. Technical Field

The invention relates to the printing of color documents. More particularly, the invention relates to the printing of black text over a colored background.

2. Description of the Prior Art

Any color visible to the human naked eye can be mapped to a single point of a three dimensional space. The CIE (Centre International de l' éclairage) has normalized color representation in three-dimensional spaces. Such spaces have taken denominations such as Lab, CIE-RGB, and Luv. A good example of this color three dimensionality is the use of three phosphores in any commercial CRT (video monitor) to display a wide range of colors on a screen. In such case, the three color vectors are red, green, and blue. Similarly, and in theory, only three inks should be sufficient to render any color on a piece of white paper. Printing is an additive process. Accordingly, cyan, magenta, and yellow inks should be able to do the job of printing any color on white materials.

Unfortunately, because of chemical interactions between the colorants themselves, and because of interactions between the colorants and the printed material, it is nearly impossible to print grays consistently with only three colorants. Therefore, a fourth ink, i.e. black, is almost always added to cyan, magenta, and yellow in any printing devices. This technique is applied in the industry from traditional industrial offset printing to state of the art digital printers.

A fast growing category of color print device is that of color laser printers, which include optical and digital devices. All of these devices print color documents in four successive passes, where the four inks are first deposited in sequence onto an imaging drum which, in turn, imposes the media.

Although these digital devices can vary greatly in their specific ways of depositing colorants onto a white media, most of them are subject to color plane misregistration, where the same logical position on a page is actually mapped to different, albeit close by, physical locations on the printed materials for the four color planes. Mechanically, it is indeed very difficult for high resolution devices to have the four color planes perfectly superimposed.

One striking example where this misregistration issue is most acute is when black text is printed on top of a saturated color background. For the reasons explained above, the text is most likely to be rendered using the black colorant only, while the saturated colored background is rendered by using large amounts of cyan, magenta, or yellow colorants, or a combination of these colorants, without any or with hardly any black colorant. Because of the plane misregistrations, it is very likely that the printed sample displays a thin white border surrounding text printed on saturated colored backgrounds. As a result, black text print quality is significantly degraded.

This misregistration issue is well known in the industry and several attempts have been made to remedy it. See, for example R. Coleman, Non Uniform Modification of Process Black Colorants To Achieve Conflicting Quality Requirements, U.S. Pat. No. 5,737,088 (Apr. 7, 1998); R. Coleman, Automatic Algorithmic Determination of Process Black Over A Color Field, U.S. Pat. No. 5,784,172 (Jul. 21, 1998); N Goodman, P. Torpey, S. Harrington, B. Smith, Registration of color imagex, European Patent Application No. EP 0 833 216 (filed Sep. 22, 1997); R. Coleman, Method and system for digital color printing, European Patent Application No. EP 0 782 098 (filed Dec. 20, 1996); and R. Dermer, E. Reifenstein, Method for Determining Color Boundaries For Correcting For Plate Misregistration in Color Printing, U.S. Pat. No. 5,313,570 (May 17, 1994).

Such known techniques unfortunately spawn undesirable side effects, even if they fix the black vs. colored background misregistration problem. For example, if the technique of Coleman (EP 0 782 098) is applied, it is likely that a continuous thick black strip running on top of a white area of the page and, e.g. a yellow area of the page, show a noticeable density shift, even possibly a hue shift at the white/yellow border. See, for example, FIG. 1 which is a schematic diagram showing the printing on a page 10 of a black strip 12 on top of a yellow strip 14 according to the prior art. It can be seen that, where process black (k+y) is printed, that is where the black strip is over the yellow strip, there is an objectionable black density and hue shift.

SUMMARY OF THE INVENTION

The invention provides a technique for printing black text on a colored background. When the incoming graphic information is a Page Description Language (PDL) data file (e.g. Adobe Postscript-PS- or Hewlett-Packard PCL), the graphic objects are broken down into three categories: text, polygons (also referred to as line drawing or vectors), and images (also referred to as bitmaps or raster data). If the object is not a text object, it is processed in a normal manner. If the object is a text object, a determination is made if the color of the object is black. If the object is not a black text object, it is processed in a normal manner. If the object is a black text object, special processing and rasterization techniques are applied. Thus, the invention exploits to advantage the fact that it is possible in most PDL instances to treat black text differently from other black objects.

DETAILED DESCRIPTION OF THE INVENTION

Figure 2:
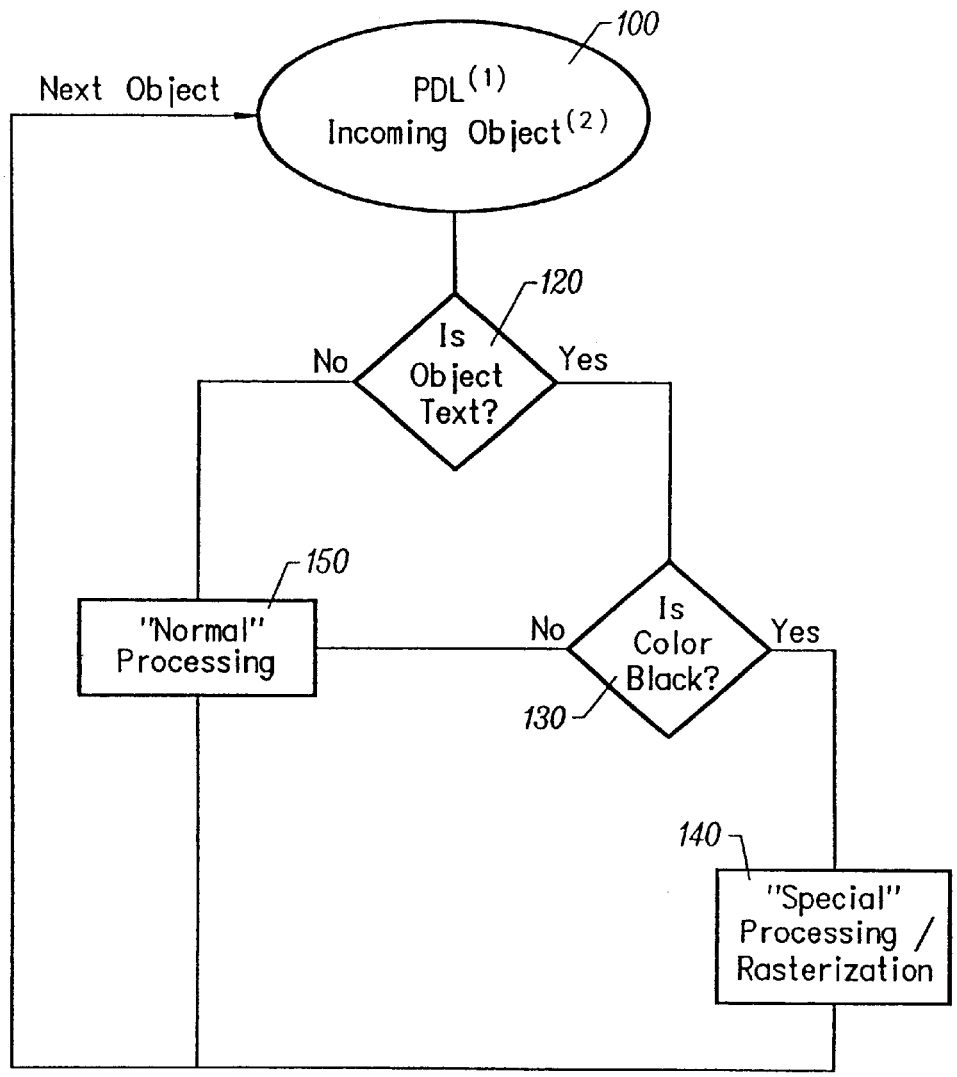
FIG. 2 is a flow diagram showing a technique for printing black text on a colored background according to the invention.

FIG. 2 is a flow diagram showing a technique for printing black text on a colored background according to the invention. When the incoming graphic information is a Page Description Language (PDL) data file (e.g. Adobe Postscript-PS- or Hewlett-Packard (HP) PCL) (100), the graphic objects are broken down into three categories: text (120), polygons (also referred to as line drawing or vectors), and images (also referred to as bitmaps or raster data). Note that this breaking down into three categories is inherent to any PDL. An object the user intends to paint or draw on a page is either text, a path (outline) with stroking/painting information (=polygons) or images (raster data). If the object is not a text object, it is processed in a normal manner (150). If the object is a text object, a determination is made if the color of the object is black (130). A text object is provided with a 'context' which supplies e.g. color, typeface, and size. If the object is not a black text object, it is processed in a normal manner (150). If the object is a black text object, special processing and rasterization techniques disclosed herein are applied (140). For example, the background color is first printed. For those locations on which black text is to be printed, the contiguous background color information is saved and used to print the background color to those locations. The black text is then overprinted on the background color, i.e. the background color information is added to the black text information. In this way, any gaps that may result from misregistration are filled by the background color. Thus, the invention exploits to advantage the fact that it is possible in most PDL instances to treat black text differently from other black objects.

Figure 1:
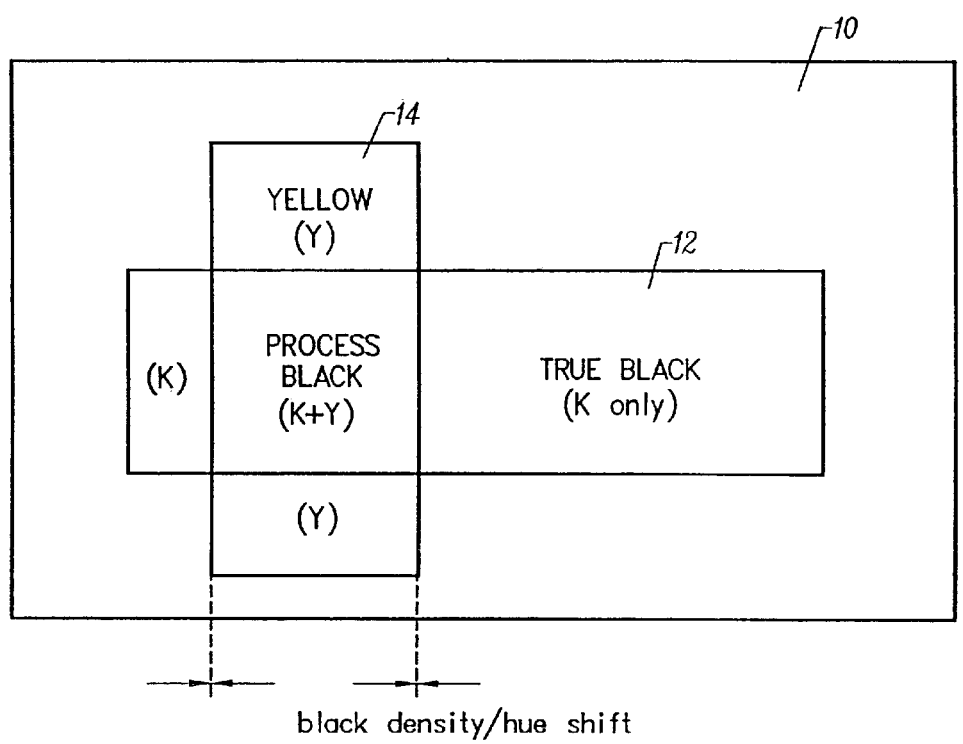
FIG. 1 is a schematic diagram showing the printing on a page of a black strip on top of a yellow strip according to the prior art.

The invention selectively applies techniques that circumvent black misregistration issues solely with regard to the printing of black text on a color background. Indeed, negative side effects that are likely to show up on non-selective techniques (e.g. as shown on FIG. 1) are greatly reduced by the invention because printed black text is, in most cases, so thin that any slight density or hue shifts within black characters that may result from application of the invention are not noticeable to the naked eye.

An example is provided below of such a technique applied to a PS and a PCL document.

Whenever a source object of color S is to be applied onto a colored background of color B, the resulting (destination) color D is computed according to a predefined scheme F:

$$D=F(S,B).$$

For instance, one case is when the print process is opaque and D=S. This is the default rendering algorithm for the Adobe's postscript language. In general, PDLs allow for more elaborate combinations where the destination color is a non-trivial combination of the source and the background. HP's PCL language is a good example of this.

Another major difference between the two languages is that color representation inside the Postscript interpreter is encoded on four bytes, cmyk, while the PCL interpreter only concerns three byte data cmy (or rgb, which is logically equivalent).

The following are two specific implementations of the invention for PS and PCL, bearing in mind that the invention herein can be easily applied to other PDLs, whether they use three or four byte color encoding. Also, for clarity, the overprint operations are described for both cases, i.e. where the black text overprint mechanism is enabled and disabled.

EXAMPLE 1
Postscript Language

A black text overprint implementation for the Postscript opaque, 4-byte, case is as follows (in pseudo C-code):

c,m,y,k(b) is the cmyk value of the background immediately before the text is to be rendered; and c,m,y,k(d) is the resulting color.

If the black text overprint mechanism is disabled, the result (regardless of source types and color) is:

c,m,y,k(d)=c,m,y,k(s)/* simple opaque 4-byte operation*/

If the black text overprint mechanism is enabled, the result is:

if (object to be rendered is text and color is black: c=m=y=0, k=255)

```
{
    /* black text overprint*/
    c,m,y,k(d) = c,m,y(b),255
    /* background color value is added to the black information in
    the k-byte*/
}
else
{
    /* 'normal' path */
    c,m,y,k(d) = c,m,y,k(s)
}
```

EXAMPLE 2
PCL Language

An example of a black text overprint implementation for the PCL language follows. The example is presented in two pseudo C-code parts.

PCL uses a three dimensional color representation, i.e. in the PCL data stream, and inside the PCL interpreter, each color is represented by only three components: c, m, and y. For convenience, each color is encoded on four bytes, where the k-byte is unused until the final conversion of cmy to cmyk, immediately before physical printing.

The expression c,m,y,k(b) is the cmyk value of the background immediately before the text is to be rendered. The expression c,m,y,k(d) is the color that results from combining the source with the background according to a predefined function F. The expression c,m,y,k(t) is the cmyk value of a temporary color needed in this implementation of the invention.

Part 1. Inside the Interpreter

If the black text overprint mechanism is disabled, the result (regardless of source types and color) is:

c,m,y(d)=F(c,m,y(s);c,m,y(b))

If the black text overprint mechanism is enabled, the following occurs:

if (object to be rendered is text and color is black: c=m=y=255)

```
{
    if (background color is not white-either c or m or y is not 0)
    {
    /* black text overprint*/
        c,m,y,k(t) = c,m,y,k(b) /* original background color is saved */
        if(k(b) = 255) /* background k-byte is 255 from previous
    operations*/
            c,m,y,k(b) = 255,255,255,0
        c,m,y,k(d) = F(black text(source),c,m,y,k(b))
        if (destination is process black) /* c=m=y=255, k=0*/
            c,m,y,k(d) = c,m,y(t),255 /* background color value
    is added to the black information in the k-byte*/
    }
    else /* 'normal' path */
    {
        c,m,y,k(d) = F(black text(source),c,m,y,k(b))
    }
}
```

Part 2. cmy to cmyk Immediately Before Physical Printing

In this example:

cmyk(i) is the input color from the PCL interpreter
cmyk(o) is the output color sent to the printer
cmy(t) is a temporary 3-byte color If the black text overprint mechanism is disabled, the result (regardless of source types and color) is:

cmyk(o)=T(cmy(i))

where T is a printer specific transform.

If the black text overprint mechanism is enabled, we have:

if (k(i)=255)/* it is black text overprint */

```
{
    cmy(o) = T(cmy(i))
    k(o) = 255
}
else /* 'normal' path */
{
    cmyk(o) = T(cmy(i))
}
```

Figure 3:
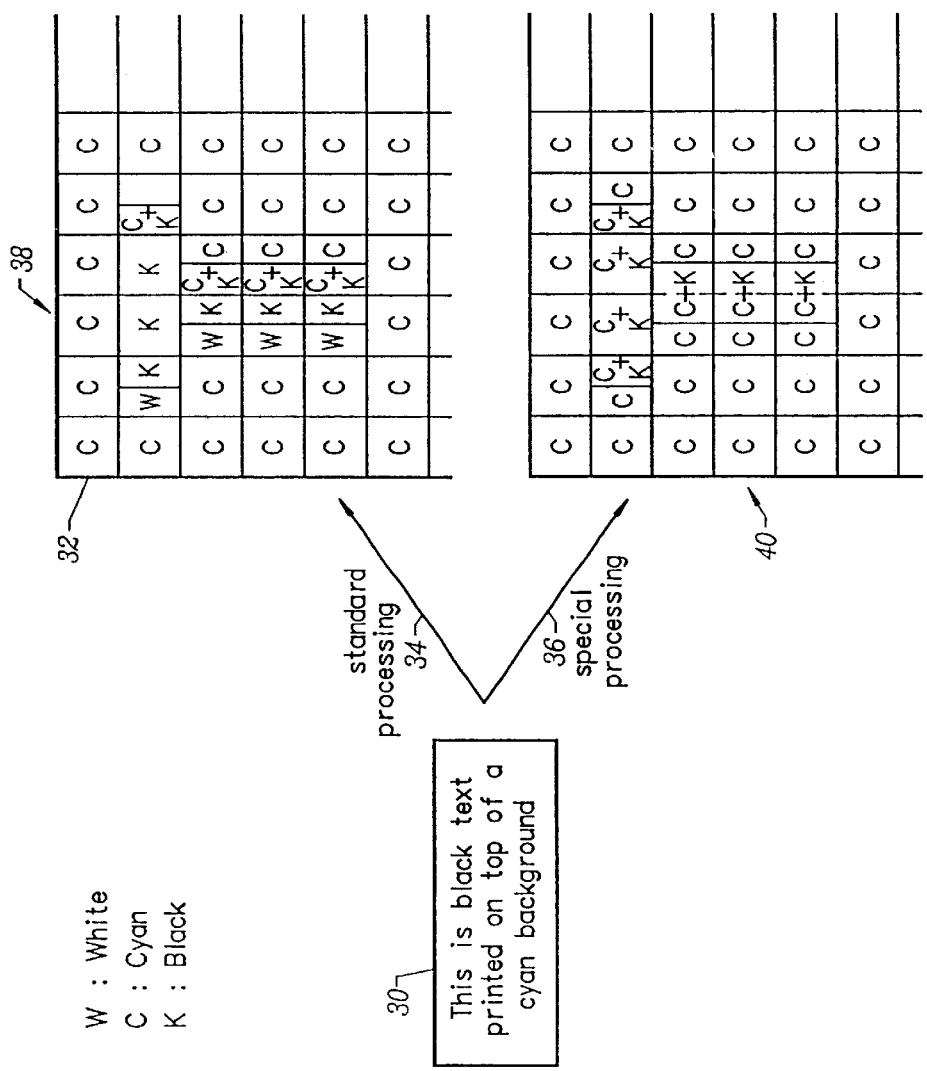
FIG. 3 is a schematic diagram showing the printing of black text over a colored background according to the invention, as compared with that for the prior art.

FIG. 3 is a schematic diagram showing the printing of black text over a colored background according to the invention, as compared with that for the prior art. In FIG. 3, standard black text is shown printed on top of a cyan background 30. A standard processing path 34 and a black text overprint processing path according to the invention 36 are shown. In each resulting print, each square 32 represent a printed pixel and the black plane is misregistered by one-half pixel to the right to demonstrate the result in each case.

The standard processing path produces a print 38 in which misregistration results in some pixels that are part white (W) because no ink is deposited at these locations and part black (K), and others that are part cyan (C) and part black overprinted on cyan (C+K). Visually, an unattractive white gap is produced at one edge of the black text.

The processing path according to the invention produces a print 40 in which misregistration results in a cyan background (C) over which black text is printed (C+K). As a result, the black text is always bordered uniformly by a cyan background.

Figure 4:
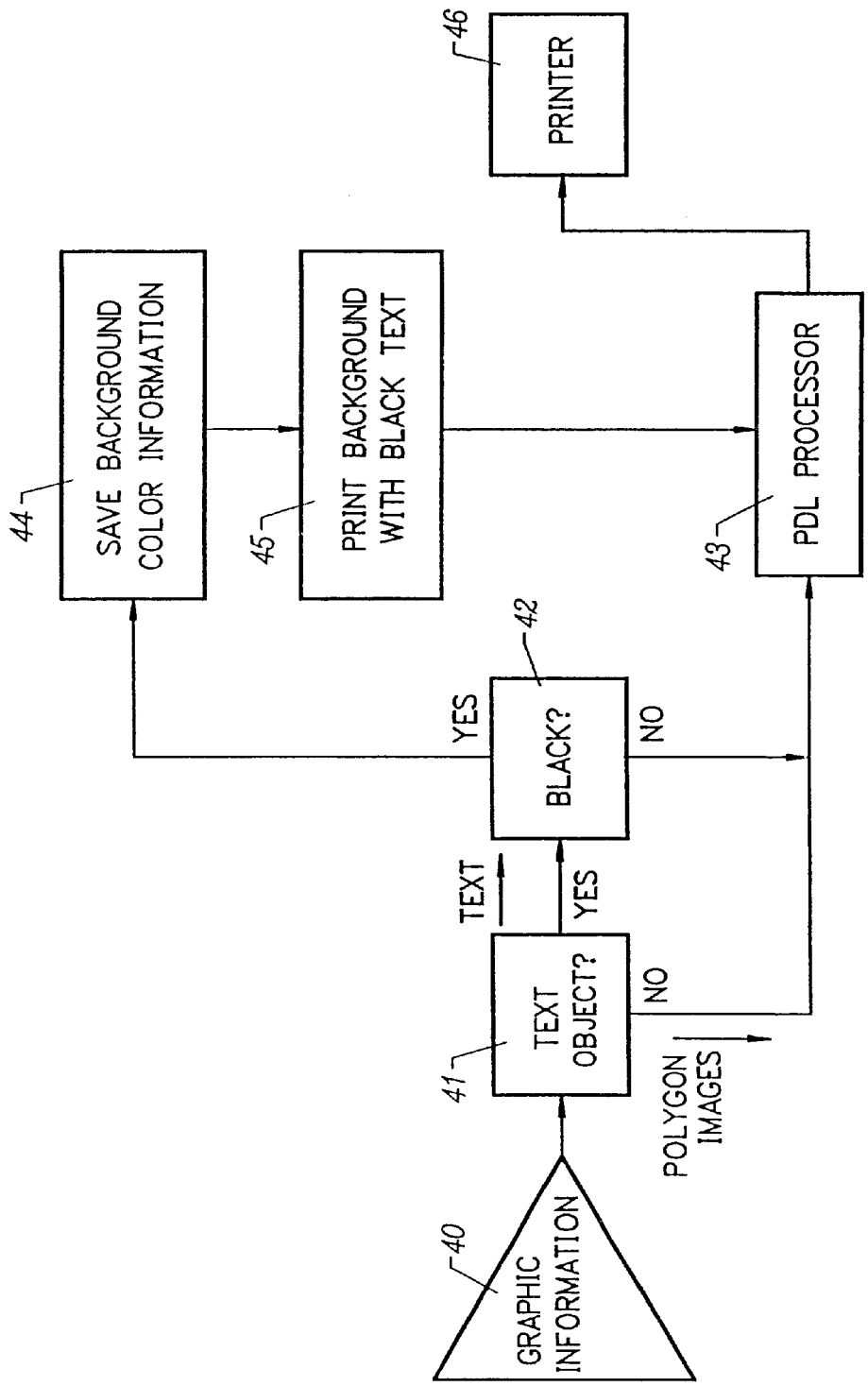
FIG. 4 is a block schematic diagram of an apparatus for printing black text on a colored background according to the invention.

FIG. 4 is a block schematic diagram of an apparatus for printing black text on a colored background according to the invention. IN FIG. 4, a graphic information file 40 is provided from a source such as a scanner or a file stored on a computer memory. Means are provided for testing the graphic information 41 to determine the type of objects contained therein. If the objects are non-text, e.g. polygons or images, the PDL processor 43 processes the graphic information in a standard fashion as is known in the art and the information is then routed to a printer 46. If the graphic information contains text objects, a determining means 42 determines whether the text is black text or other text. If the text is other text, it is processed by the PDL processor in a standard fashion. If the text is black text, any underlying color background information is saved in a memory or register 44 and means are provided for combining the color background information with the black text information 45 (using techniques, for example, as are discussed above). The combined black text and background color information are provided to the PDL processor for further processing as may be necessary pursuant to printing the information, and the combined information is then printed on the printer.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for compensating for color plane misregistration comprising the steps of:

providing a data file of incoming graphic information that includes a plurality of object categories, wherein one of said object categories is text objects;

determining if an object within said incoming graphic information is a text object, wherein if said object is not a text object it is processed in a normal manner;

if said object is a text object, determining color of said text object;

wherein, if said text object is not black, it is processed in a normal manner; and wherein, if said text object is black, applying selected processing to said object;

wherein said selected processing comprises a black text overprint mechanism;

whereby gaps resulting from misregistration are filled with a background color.

2. The method of claim 1, wherein said selected processing comprises the steps of:

saving contiguous background color information for locations on which black text is to be printed;

printing an appropriate background color to said locations on which black text is to be printed; and overprinting said black text on said background color;

wherein any gaps that may result from misregistration are filled by said background color.

3. The method of claim 2, wherein said overprinting step further comprises the step of:

adding background color information to said black text information.

4. The method of claim 1, wherein said incoming graphic information comprises a Page Description Language (PDL) data file.

5. The method of claim 4, wherein said PDL data file is any of a Postscript or PCL file.

6. The method of claim 1, further comprising the step of:

breaking down said incoming graphic information into categories comprised of said objects.

7. The method of claim 6, wherein said graphic information is broken down into at least three categories comprising text, polygons, and images.

8. The method of claim 1, wherein said black text overprint mechanism comprises:

a black text overprint mechanism for a Postscript language interpreter, in which c,m,y,k(b) is a cmyk value of a background immediately before text is to be rendered; and c,m,y,k(d) is a resulting color, wherein:

c,m,y,k(d)=c,m,y,k(s)

If said black text overprint mechanism is disabled; and wherein:

it (object to be rendered is text and color is black: c=m=y=0, k=255)

```
{
    c,m,y,k(d) = c,m,y(b),255
                                  }
else
    {
        c,m,y,k(d) = c,m,y,k(s)
}
``` if said black text overprint mechanism is enabled.

9. The method of claim 1, wherein said black text overprint mechanism comprises:

a black text overprint mechanism for a PCL language interpreter, in which each color is represented by three components: c, m, and y;

in which each color is encoded on four bytes for convenience, where the k-byte is unused until a final conversion of cmy to cmyk, immediately before physical printing; and in which the expression c,m,y,k(b) is a cmyk value of a background 5 immediately before text is to be rendered; the expression c,m,y,k(d) is a color that results from combining a source with a background according to a predefined function F; and the expression c,m,y,k(t) is a cmyk value of a temporary color; wherein:

c,m,y(d)=F(c,m,y(s);c,m,y(b))

if said black text overprint mechanism is disabled; and wherein:

it (object to be rendered is text and color is black: c=m=y=255)

```
{
    if (background color is not white-either c or m or y is not 0)
    {
        c,m,y,k(t) = c,m,y,k(b)
        if(k(b) = 255)
            c,m,y,k(b) = 255,255,255,0
        c,m,y,k(d) = F(black text(source),c,m,y,k(b))
        if (destination is process black)
            c,m,y,k(d) = c,m,y(t),255
    }
    else
    {
        c,m,y,k(d) = F(black text(source),c,m,y,k(b))
    }
}
``` if said black text overprint mechanism is enabled.

10. The method of claim 9, wherein cmyk(i) is an input color from said PCL language interpreter; cmyk(o) is an output color sent to a printer; and cmy(t) is a temporary 3-byte color; wherein cmyk(o)=T(cmy(i))

if said black text overprint mechanism is disabled; and wherein if (k(i)=255)

```
{
    cmy(o) = T(cmy(i))
    k(o) = 255
}
else
{
    cmyk(o) = T(cmy(i))
}
``` if said black text overprint mechanism is enabled.

11. An apparatus for compensating for color plane misregistration comprising:

means for determining if an object within said incoming graphic information is a text object, wherein if said object is not a text object it is processed in a normal manner;

if said object is a text object, means for determining color of said text object;

wherein if said text object is not a black text object, it is processed in a normal manner; and means for applying selected processing to said text object if said text object is a black text object;

wherein said selected processing comprises a black text overprint mechanism;

whereby gaps resulting from misregistration are filled with a background color.

12. The apparatus of claim 11, wherein said means for applying selected processing comprises:

means for saving contiguous background color information for locations on which black text is to be printed;

means for printing an appropriate background color to said locations on which black text is to be printed; and means for overprinting said black text on said background color;

wherein any gaps that may result from misregistration are filled by said background color.

13. The apparatus of claim 12, wherein said overprinting means further comprises:

means for adding background color information to said black text information.

14. The apparatus of claim 11, wherein said incoming graphic information comprises a Page Description Language (PDL) data file.

15. The apparatus of claim 14, wherein said PDL data file is any of a Postscript or PCL file.

16. The apparatus of claim 11, further comprising the step of:

means for breaking down said incoming graphic information into categories comprised of said objects.

17. The apparatus of claim 16, wherein said graphic information is broken down into at least three categories comprising text, polygons, and images.

18. The apparatus of claim 11, wherein said black text overprint mechanism comprises:

a black text overprint mechanism for a Postscript language interpreter, in which c,m,y,k(b) is a cmyk value of a background immediately before text is to be rendered; and c,m,y,k(d) is a resulting color, wherein:

c,m,y,k(d)=c,m,y,k(s)

If said black text overprint mechanism is disabled; and wherein:

if (object to be rendered is text and color is black: c=m=y=0, k=255)

```
{
    c,m,y,k(d) = c,m,y(b),255
}
else
{
c,m,y,k(d) = c,m,y,k(s)
}
``` if said black text overprint mechanism is enabled.

19. The apparatus of claim 11, wherein said black text overprint mechanism comprises:

a black text overprint mechanism for a PCL language interpreter, in which each color is represented by three components: c, m, and y;

in which each color is encoded on four bytes for convenience, where the k-byte is unused until a final conversion of cmy to cmyk, immediately before physical printing; and in which the expression c,m,y,k(b) is a cmyk value of a background immediately before text is to be rendered; the expression c,m,y,k(d) is a color that results from combining a source with a background according to a predefined function F; and the expression c,m,y,k(t) is a cmyk value of a temporary color; wherein:

$$c,m,y(d)=F(c,m,y(s);c,m,y(b))$$

if said black text overprint mechanism is disabled; and wherein:

if (object to be rendered is text and color is black: c=m=y=255)

```
{
    if (background color is not white-either c or m or y is not 0)
    {
        c,m,y,k(t) = c,m,y,k(b)
        if(k(b) = 255)
            c,m,y,k(b) = 255,255,255,0
        c,m,y,k(d) = F(black text(source),c,m,y,k(b))
        if (destination is process black)
            c,m,y,k(d) = c,m,y(t),255
    }
    else
    {
        c,m,y,k(d) = F(black text(source),c,m,y,k(b))
    }
}
``` if said black text overprint mechanism is enabled.

20. The apparatus of claim 19, wherein cmyk(i) is an input color from said PCL language interpreter; cmyk(o) is an output color sent to a printer; and cmy(t) is a temporary 3-byte color; wherein $$cmyk(o)=T(cmy(i))$$

if said black text overprint mechanism is disabled; and wherein if (k(i)=255)

```
{
    cmy(o) = T(cmy(i))
    k(o) = 255
}
else
{
    cmyk(o) = T(cmy(i))
}
``` if said black text overprint mechanism is enabled.

21. A method for printing black text on a colored background, comprising the steps of:

providing a data file of incoming graphic information that includes a plurality of object categories, wherein one of said object categories is text objects, determining if an object within said incoming graphic information is a text object, wherein if said object is not a text object it is processed in a normal manner;

if said object is a text object, determining color of said text object;

wherein, if said text object is not black, it is processed in a normal manner; and wherein, if said text object is black, applying selected processing to said object;

wherein said wherein said selected processing comprises:

a black text overprint mechanism for a Postscript language interpreter, in which c,m,y,k(b) is a cmyk value of a background immediately before text is to be rendered; and c,m,y,k(d) is a resulting color, wherein:

$$c,m,y,k(d)=c,m,y,k(s)$$

If said black text overprint mechanism is disabled; and wherein:

if (object to be rendered is text and color is black: c=m=y=0, k=255)

```
{
    c,m,y,k(d) = c,m,y(b),255
else
    {
        c,m,y,k(d) = c,m,y,k(s)
    }
}
``` if said black text overprint mechanism is enabled.

22. A method for printing black text on a colored background, comprising the steps of:

providing a data file of incoming graphic information that includes a plurality of object categories, wherein one of said object categories is text objects, determining if an object within said incoming graphic information is a text object, wherein if said object is not a text object it is processed in a normal manner;

if said object is a text object, determining color of said text object;

wherein, if said text object is not black, it is processed in a normal manner; and wherein, if said text object is black, applying selected processing to said object;

wherein said wherein said selected processing comprises:

a black text overprint mechanism for a PCL language interpreter, in which each color is represented by three components: c, m, and y;

in which each color is encoded on four bytes for convenience, where the k-byte is unused until a final conversion of cmy to cmyk, immediately before physical printing; and in which the expression c,m,y,k(b) is a cmyk value of a background 5 immediately before text is to be rendered; the expression c,m,y,k(d) is a color that results from combining a source with a background according to a predefined function F; and the expression c,m,y,k(t) is a cmyk value of a temporary color; wherein:

$$c,m,y(d)=F(c,m,y(s);c,m,y(b))$$

if said black text overprint mechanism is disabled; and wherein:

if (object to be rendered is text and color is black: c=m=y=255)

```
{
    if (background color is not white-either c or m or y is not 0)
    {
        c,m,y,k(t) = c,m,y,k(b)
        if(k(b) = 255)
            c,m,y,k(b) = 255,255,255,0
        c,m,y,k(d) = F(black text(source),c,m,y,k(b))
        if (destination is process black)
            c,m,y,k(d) = c,m,y(t),255
    }
    else
    {
        c,m,y,k(d) = F(black text(source),c,m,y,k(b))
    }
}
``` if said black text overprint mechanism is enabled.

23. The method of claim 22, wherein cmyk(i) is an input color from said PCL language interpreter; cmyk(o) is an output color sent to a printer; and cmy(t) is a temporary 3-byte color; wherein $$cmyk(o)=T(cmy(i))$$

if said black text overprint mechanism is disabled; and wherein if (k(i)=255)

```
{
    cmy(o) = T(cmy(i))
    k(o) = 255
}
else
{
    cmyk(o) = T(cmy(i))
}
``` if said black text overprint mechanism is enabled.

24. An apparatus for printing black text on a colored background from a data file of incoming graphic information that includes a plurality of object categories, wherein one of said object categories is text objects, comprising:

means for determining if an object within said incoming graphic information is a text object, wherein if said object is not a text object it is processed in a normal manner;

if said object is a text object, means for determining color of said text object;

wherein if said text object is not a black text object, it is processed in a normal manner; and means for applying selected processing to said object if said object is a black text object;

wherein said selected processing comprises:

a black text overprint mechanism for a Postscript language interpreter, in which c,m,y,k(b) is a cmyk value of a background immediately before text is to be rendered; and c,m,y,k(d) is a resulting color, wherein:

$$c,m,y,k(d)=c,m,y,k(s)$$

If said black text overprint mechanism is disabled; and wherein:

if (object to be rendered is text and color is black: c=m=y=0, k=255)

```
{
    c,m,y,k(d) = c,m,y(b),255
}
else
{
    c,m,y,k(d) = c,m,y,k(s)
}
``` if said black text overprint mechanism is enabled.

25. An apparatus for printing black text on a colored background from a data file of incoming graphic information that includes a plurality of object categories, wherein one of said object categories is text objects, comprising:

means for determining if an object within said incoming graphic information is a text object, wherein if said object is not a text object it is processed in a normal manner;

if said object is a text object, means for determining color of said text object;

wherein if said text object is not a black text object, it is processed in a normal manner; and means for applying selected processing to said object if said object is a black text object;

wherein said selected processing comprises:

a black text overprint mechanism for a PCL language interpreter, in which each color is represented by three components: c, m, and y;

in which each color is encoded on four bytes for convenience, where the k-byte is unused until a final conversion of cmy to cmyk, immediately before physical printing; and in which the expression c,m,y,k(b) is a cmyk value of a background immediately before text is to be rendered; the expression c,m,y,k(d) is a color that results from combining a source with a background according to a predefined function F; and the expression c,m,y,k(t) is a cmyk value of a temporary color; wherein:

$$c,m,y(d)=F(c,m,y(s);c,m,y(b))$$

if said black text overprint mechanism is disabled; and wherein:

if (object to be rendered is text and color is black: c=m=y=255)

```
{
    if (background color is not white-either c or m or y is not 0)
    {
        c,m,y,k(t) = c,m,y,k(b)
        if(k(b) = 255)
            c,m,y,k(b) = 255,255,255,0
        c,m,y,k(d) = F(black text(source),c,m,y,k(b))
        if (destination is process black)
            c,m,y,k(d) = c,m,y(t),255
    }
    else
    {
        c,m,y,k(d) = F(black text(source),c,m,y,k(b))
    }
}
``` if said black text overprint mechanism is enabled.

26. The apparatus of claim 25, wherein cmyk(i) is an input color from said PCL language interpreter; cmyk(o) is an output color sent to a printer; and cmy(t) is a temporary 3-byte color; wherein $$cmyk(o)=T(cmy(i))$$

if said black text overprint mechanism is disabled; and wherein if (k(i)=255)

```
{
    cmy(o) = T(cmy(i))
    k(o) = 255
}
else
{
    cmyk(o) = T(cmy(i))
}
``` if said black text overprint mechanism is enabled.

\* \* \* \* \*